June 13, 1950 R. ADLER 2,511,143

ELECTRON DISCHARGE DEVICE

Filed Feb. 12, 1948 3 Sheets-Sheet 1

ROBERT ADLER
*INVENTOR.*

BY [signature]
*HIS AGENT*

June 13, 1950 R. ADLER 2,511,143

ELECTRON DISCHARGE DEVICE

Filed Feb. 12, 1948 3 Sheets-Sheet 2

ROBERT ADLER
INVENTOR.

BY [signature]
HIS AGENT

June 13, 1950 R. ADLER 2,511,143

ELECTRON DISCHARGE DEVICE

Filed Feb. 12, 1948 3 Sheets-Sheet 3

ROBERT ADLER
INVENTOR.

BY Bruce L Birchard
HIS AGENT

Patented June 13, 1950 2,511,143

UNITED STATES PATENT OFFICE 2,511,143

ELECTRON DISCHARGE DEVICE

Robert Adler, Chicago, Ill., assignor to Zenith Radio Corporation, a corporation of Illinois Application February 12, 1948, Serial No. 7,864

15 Claims. (Cl. 250—155)

This invention relates to electron discharge devices, and more particularly, to such devices of the electron beam type.

In many vacuum tube circuits, among which perhaps the best known are circuits employed in the reception of frequency modulated signals, there arises the need for a device having limiting properties. A limiter may be defined as a device capable of clipping the peaks of an alternating voltage wave fed into it so that at its output there exists an alternating voltage of substantially constant amplitude whenever the input signal exceeds a predetermined minimum level.

It is, furthermore, desirable in many applications, including receivers for frequency modulated signals, that the process of limiting be carried out instantaneously. An instantaneous limiter may be defined as a device capable of retaining its limiting properties independently of the speed with which the amplitude of the input signal varies.

Devices are known in the prior art, such as, for instance, circuits including at least two biased rectifiers, which meet the requirements stated. These devices, however, have the disadvantage of being rather complex and requiring a large number of circuit components.

It is a primary object of the invention to provide an electron discharge device having improved inherent limiting characteristics.

A vacuum tube constructed in such a manner that the plate current remains zero over a wide range of grid voltages, then rapidly rises to a definite intensity within a narrow range of grid voltage change, and finally remains constant at that definite intensity over a second wide range of grid voltages, would be capable of meeting the requirements above stated. It is a further object to provide a vacuum tube of such construction.

In the reception of frequency modulated radio signals, it is necessary to provide means for converting the frequency variations of the received signals to amplitude variations which may be used to drive a loudspeaker or other suitable reproduction device. Such means of demodulating the input signals may be arbitrarily classified into two categories, namely, discriminators employing a pair of balanced diodes, and discriminators employing a pair of control grids arranged in cascade. In the past, discriminators of the latter type have found very limited application, since amplitude variations in the input signals are not sufficiently eliminated by a conventional mixer or converter tube. When used following a limiter, such discriminators offer no substantial advantage over the double diode type. The double diode discriminator, however, requires a separate limiter stage, a discriminator transformer, a pair of diodes and the associated resistance-capacitance load networks, and other circuit elements external to the tubes. A considerable economy of component parts might be effected if the limiter and discriminator stages could be combined. It is an important object of this invention to provide an electron discharge device which is suitable for use as a combination limiter-discriminator in connection with a frequency modulation radio receiver.

It is a further object of the invention to provide an electron discharge device of the electron beam type employing a pair of control grids arranged in cascade which combines the functions of an amplitude limiter and a frequency demodulator.

Still another object of the invention is to effect a considerable economy of parts by combining the limiter and discriminator stages of a frequency modulation radio receiver, reducing the number of circuit elements in the combined limiter-discriminator stage, to a single tuned circuit.

Yet another important object of the invention is to provide, for a frequency modulation radio receiver, such a single limiter-discriminator stage which obtains audio output comparable to that of a conventional double-diode phase sensitive discriminator.

The features of the invention which are believed to be novel are set forth with particularity in the appended claims. The invention, together with further objects and advantages thereof, may more readily be understood, however, by referring to the following description taken in connection with the accompanying drawings, in which like reference numerals indicate like elements, and in which;

It is to be understood throughout the specification and claims that, in all cases, the tube electrodes must be arranged within an evacuated envelope.

There are tubes known in the prior art in which a control grid is preceded in the electron path by a positive electrode, commonly referred to as a screen in converter tubes and as a space charge grid in some other tubes. In these tubes, the control grid following the positive electrode has characteristics which include a wide region of zero plate current and a wide region of constant plate current. In the intervening region, however, the plate current rises rather gradually, and several volts of grid voltage change are required to change the plate current from zero to its full intensity. The rise of plate current with grid voltage becomes even more gradual as the limiting intensity is approached, whereas an abrupt change from the full slope to the zero slope prevailing in the region of constant current is most desirable for limiting.

Figure 1:
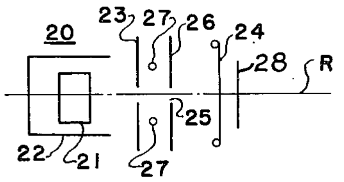
Figure 1 is a schematic representation of the electrode arrangement in a device constructed in accordance with the invention.

It has been found that it is possible to obtain the desired characteristic, consisting of a region of zero plate current separated from a region of constant current by a narrow region of high transconductance, by means of a novel tube structure. The basic configuration required is illustrated in Figure 1.

An electron gun 20, comprising a cathode 21, a directing member 22, and an accelerator 23, projects a beam of electrons upon a control grid 24 through a narrow aperture 25 in an accelerating electrode 26. An additional electrode or anode 28, responsive to an applied unidirectional operating potential for producing a unidirectional electrostatic accelerating field adjacent control grid 24 on the side thereof remote from cathode 21, is provided. The accelerating electrode 26 is operated at a positive potential at or near the anode operating potential, while the control grid 24 is operated at cathode potential, or, preferably, biased slightly negative with respect to the cathode 21. There is also provided a lens electrode 27 for adjusting the degree of convergence or divergence of the electron beam as it leaves the aperture 25 in the accelerating electrode 26. Preferably, the dimensions of the electrodes in a direction perpendicular to the plane of the drawing are made large relative to the width of the cathode emitting surface; with such an arrangement, a sheet-like electron beam of rectangular cross-section is produced, and large values of beam current may be obtained with relatively low operating voltages.

It has been found, in accordance with the invention, that whenever the distance from the aperture 25 to the control grid 24 is large compared to the width of the aperture 25 itself, it is possible to adjust, for any given beam current, the potentials on the lens electrode 27 and on the accelerating electrode 26 in such a manner that unusually high transconductance is obtained over a narrow range of voltages applied to control grid 24, while at more negative voltages the anode current remains zero and at more positive voltages it remains constant. It is especially important that the rise of the plate current remains rapid up to the immediate vicinity of that grid voltage at which the anode current becomes constant.

It is known in the prior art that improved transconductance is obtained in a control grid preceded by a positive electrode if the electrons are so directed that they arrive at the control grid with substantially perpendicular incidence. On the other hand it has been found desirable to reduce the number of electrons which, after having been rejected by the control grid, return through the positive electrode to the vicinity of the cathode whence they originated. For this purpose, means for deflecting the electrons, such as rods positioned in the interelectrode space or forming part of the control grid, are commonly used. The requirements of sufficient deflection of returning electrons and of perpendicular incidence of passing electrons are, however, mutually contradictory in tubes built according to the prior art.

By making the electron space current emerge from an aperture which is narrow compared to the distance between that aperture and the control grid, it has been made possible for both requirements to be met simultaneously. More specifically, it is believed that the process which takes place in the space between the aperture 25 and the control grid 24 may be described as follows.

The effective potential in a plane immediately adjacent the control grid 24 may be represented in a well-known manner by the potential of the control grid plus a fraction of the potential of the positive electrode following the control grid. If this effective potential is slightly positive, and if the configuration and the potential of the lens electrode 27 are so adjusted that the trajectories of electrons leaving the aperture are substantially parallel, a minimum positive potential can be found which, when applied to the accelerating electrode 26, renders positive the potential everywhere within the beam between the accelerating electrode and the control grid, so that all of the electrons pass through the grid. Under these circumstances, the beam remains narrow throughout the space from the aperture to the control grid. If, on the other hand, control grid 24 is made sufficiently negative to render the effective potential zero or slightly negative, electrons can no longer pass the potential barrier so established, and all electrons turn about. Because every electron now traverses twice the space between the accelerating electrode 26 and the control grid 24, the space charge existing between these two electrodes is doubled, and a divergent electrostatic field is set up in this space. The electron trajectories which were originally substantially parallel are now bent away from the center of the beam, with the result that most of the returning electrons strike the solid parts of accelerating electrode 26 rather than passing through the aperture 25 on their return trip.

Thus, it is possible to have electron trajectories which intersect the control grid substantially at right angles as long as all of the beam is passed. This makes it possible to pass the entire beam even at a very low effective potential in a plane adjacent the control grid. However, once the grid potential becomes negative enough to stop a substantial number of the electrons, the resulting increase in space charge bends the trajectories and thereby reduces cumulatively that number of the electrons which can still pass through the grid, while at the same time deflecting the returning electrons away from the aperture.

The structure shown in Figure 1 represents a flexible arrangement on which the properties of devices built according to this invention may conveniently be studied. It is more economical, however, so to construct the device that certain elements perform dual functions. More specifically, it is desirable to combine the accelerator 23 of the electron gun 20 with the accelerating electrode 26 and to omit the lens electrode 27. If the position of the electron gun is properly chosen with reference to the width of aperture 25 and the spacing between that aperture and control grid 24, it becomes possible to operate electrodes 23 and 26 at a common positive potential. Furthermore, omission of the lens electrode 27 makes it necessary so to construct the electron gun 20 that the electron trajectories at the point where the electron beam leaves the aperture 25 are substantially parallel. A structure which fulfills these conditions is shown schematically in Figure 2.

Figure 2:
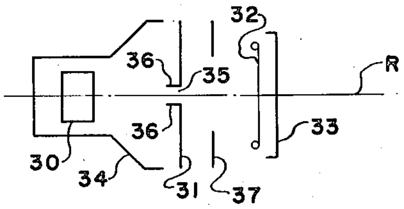
Figure 2 is a schematic representation of a simplification of the arrangement of Figure 1.

In Figure 2, a plurality of electrodes are arranged in substantially symmetrical relation with respect to a reference plane R, such electrodes including in the order named, a cathode 30, an accelerating electrode 31, a control grid 32, and an anode 33. A beam-forming or directing plate 34, constructed of electrically conductive material, is arranged to surround the cathode 30 in such a way that electrons emitted by the cathode are formed into a convergent beam. Accelerating electrode 31 is provided with a centrally located aperture or slot 35 which registers with the electron beam, so that a positive potential appearing on electrode 31 results in an accelerating field between slot 35 and cathode 30. Outwardly extending portions 36 may be provided on each side of slot 35 to adjust the refractive power of slot 35; it is preferred that portion 36 extend parallel to the axis and toward the cathode 30, in order to insure that the electrons emitted from the cathode 30 are formed into a substantially parallel beam in the region between electrodes 31 and 32.

Focusing means 37, such as a pair of rods or a member having a slot, preferably are inserted between the accelerating electrode 31 and the grid 32. Focusing means 37 insure that all the electrons emerging from slot 35 are directed to the grid 32. In operation, it is preferred, in order to minimize the number of external connections, to connect focusing means 37 directly to the cathode 30. The anode current $I_b$-grid voltage $E_c$ characteristics of a tube such as that shown and described in connection with Figure 2 are shown in idealized form in Figure 3. These characteristics are of the step function type, in which a wide region 41 of constant anode current operation is separated from a region 42 of zero anode current operation by a narrow region 43 of high transconductance, region 43 occurring at increasingly negative values of grid voltage with increasing anode operating voltage $E_b$.

While a tube constructed as shown and described in connection with Figures 1 and 2 provides inherent limiting characteristics, the interelectrode capacity between anode and grid is undesirably high, and the internal anode resistance is undesirably low, for some practical applications. There is shown in Figure 4 a schematic representation of a tube not only embodying the advantages of the structures of Figures 1 and 2, but also having anode characteristics approaching those of a beam power tube or pentode.

Figure 4:
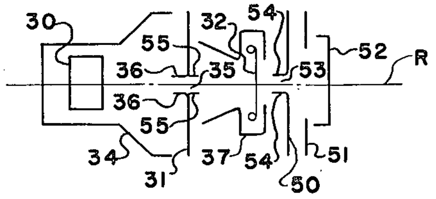
Figure 4 is a modification of the arrangement of Figure 2.

The structure shown in Figure 4 is a modification of that shown and described in connection with Figure 2, the anode 33 of Figure 2 being replaced by a second accelerating electrode 50 followed by second focusing means 51 and an anode 52. In this embodiment, the second accelerating electrode 50, constituting the additional electrode responsive to an applied unidirectional operating potential for producing a unidirectional accelerating electrostatic field adjacent control grid 32, is provided with a slot or aperture 53 which registers with the electron beam projected through the grid 32. Extending portions 54, extending on each side of slot 53 toward the control grid 32, are provided to produce the desired field configuration. In addition, the contour of first focusing means 37 is adapted in a preferred way to insure substantially perpendicular incidence of the electron beam on the control grid 32. To this end also, additional extending portions 55 are provided on each side of slot 35, such additional portions being directed toward the grid 32.

Figure 3:
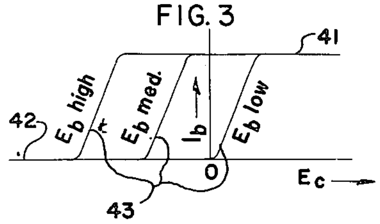
Figure 3 is an idealized graphical representation of the anode current-grid voltage characteristic of the device schematically shown in Figure 2.

In operation, a device constructed in accordance with Figure 4 is distinguished by an operating characteristic similar to a single curve of Figure 3, the lower limit of the constant current region 41 being determined by the operating potentials of the accelerating electrodes 31 and 50 and the anode 52. In practice, it is preferred to operate the accelerating electrodes 31 and 50 at a common positive potential, at or near the potential at the anode 52, although such operation is not essential. Furthermore, in order to minimize the number of external connections of the device, it is preferred to connect internally the directing member 34 and focusing means 37 and 51 to the cathode.

Figure 5:
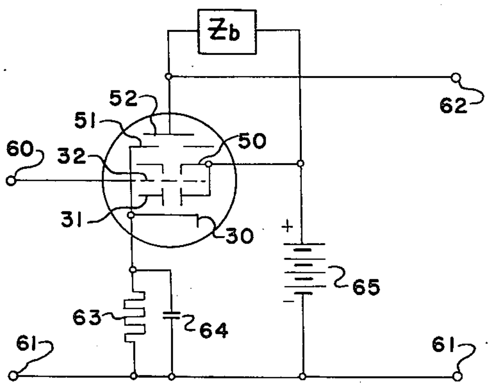
Figure 5 is a schematic circuit diagram, incorporating the device of Figure 4, of a circuit incorporating the device of Figure 4.

A practical circuit incorporating the device of Figure 4 is shown in Figure 5. The circuit is provided with an input terminal 60 and an output terminal 62, a common terminal 61 being provided for both input circuit and output circuit. Input signals are applied to the control grid 32 by means of input terminals 60 and 61. Suitable operating bias is supplied by means of a cathode bias resistance 63 and associated bypass capacitance 64 connected between the cathode 30 and the common terminal 61. The accelerating electrodes 31 and 50 are connected together and to the positive terminal of a suitable source of unidirectional operating potential, such source being here shown as a battery 65, the negative terminal of which is connected to the common terminal 61. The anode 52 is connected to the positive terminal of battery 65 through a suitable load impedance $Z_b$. Output is obtained between the output terminal 62, connected to anode 52, and the common terminal 61.

Figure 6:
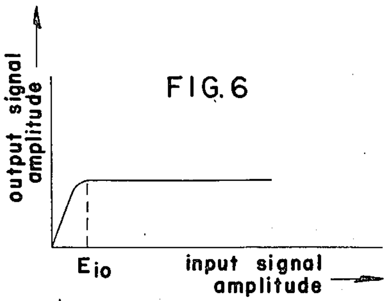
Figure 6 is a graphical representation of an operating characteristic of the device of Figure 4.

A system as shown in Figure 5 is characterized by an operating curve such as that shown in Figure 6. In other words, whenever the input signal exceeds a certain critical minimum amplitude $E_{io}$, an output signal of substantially constant amplitude is obtained.

Referring again to Figure 5, it is possible to obtain output voltages of various waveforms from a sinusoidal input, the waveform of the output voltage depending on the nature of the load impedance $Z_b$. By making $Z_b$ a tuned circuit resonating at a suitable frequency, a sinusoidal output at the input frequency or one of its harmonics may be obtained; for example, an harmonic generator constructed in this manner is disclosed and claimed in the copending application of Robert Adler, Serial No. 118,074, filed September 27, 1949, for "Harmonic generators," and assigned to the present assignee. A resistive load $Z_b$ results in a square wave output. A triangular wave is obtained if $Z_b$ is capacitive, and, by making $Z_b$ inductive, a series of sharp impulses of alternating polarity is produced. The output appearing between terminals 62 and 61, however, is always substantially constant, both in amplitude and waveform, so long as the input signal exceeds the critical amplitude $E_{10}$. Thus, the circuit of Figure 5 may be adapted to many applications, such as, for example, a limiter in a frequency modulation radio receiver.

A device constructed in accordance with the schematic representation of Figure 4 provides an exceptionally wide region of constant anode current operation and is especially adapted as a limiter; furthermore, such limiting is accomplished instantaneously, without the time constants associated with circuits using ordinary pentodes or beam power tubes.

In a receiver for frequency modulated signals, such instantaneous limiting results in a decreased tendency to pick up ignition noise or similar extraneous disturbances.

As an additional advantage, the use of an accelerating electrode in place of a screen grid results in a decrease in that portion of the fluctuation noise caused by the random variation of the division of space current between the screen and anode circuits. This property, in connection with the high ratio of transconductance to anode current attained in devices constructed according to this invention, makes tubes of the type shown in Fig. 4 particularly suitable for amplifiers operating at extremely low input voltage levels where signal-to-noise ratio is an important consideration.

As a further embodiment of the invention, it is possible to construct an electron discharge device, for use in a frequency modulation radio receiver, which combines in a single electron stream the functions of amplitude limiter and a frequency demodulator of the type hereinafter referred to as a space charge discriminator. The space charge discriminator, as such, is disclosed and claimed as to its broader aspects in U. S. Patent Number 2,208,091 to Zakariás. U. S. Patent Number 2,233,706 to Kalmus teaches the incorporation in the circuit of Zakariás of the function of amplitude limiting by the proper selection of self-biasing circuit elements.

In practice, it has been found that the circuits of Zakariás and Kalmus are subject to undesirable restrictions imposed by the limitations of the presently available discharge devices.

In the first place, the system described by Zakariás must follow an amplitude limiting system in order to realize optimum operating conditions. While the circuit of Kalmus combines the limiting and demodulating functions, the limiting accomplished by such a circuit is satisfactory over only a narrow range of input signal amplitudes. Furthermore, instantaneous limiting can not be obtained with a circuit of this type.

In the second place, optimum operation of the systems of Zakariás and Kalmus is approached only when the second control grid is characterized by a uniformly high transconductance, not obtainable in conventional vacuum tubes.

In accordance with the present invention, a tube possessing the requisites of low limiting level and high transconductance is provided by cascading within a single envelope two systems of the type shown and described in connection with Figure 2. Such a tube is shown schematically in Figure 7.

Figure 7:
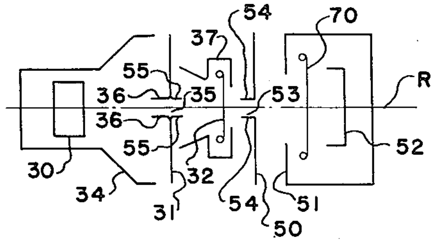
Figure 7 is a schematic representation of a further modification of the invention.

The device of Figure 7 is similar in its structural features to that of Figure 4. A second control grid 70, hereinafter referred to as the quadrature grid, is disposed between second focusing means 51 and the anode 52. In addition, focusing element 51 is extended also to function as electrostatic shield between the input grid 32 and the quadrature grid 70, thereby to minimize the intergrid capacity. In all other respects, the structure represented by Figure 7 is identical to that shown and described in connection with Figure 4.

In the device of Figure 7, the input grid 32 has associated therewith a characteristic resembling a step function, with a region of constant current separated from a zero current region by a narrow region of high transconductance, as shown in Figure 3. By suitably spacing and arranging the electrodes, the constant current region may be made to commence at an input grid voltage having a negative value.

Since the electron stream passes through the first grid in the form of a concentrated beam, it may be directed through a second system, comprising the second slot 53 and the second grid 70, similar to the first system comprising the first slot 35 and the first grid 32. The second grid 70 has a characteristic similar to that of the first grid 32, provided that the first grid is operated within the constant current region.

Figure 8:
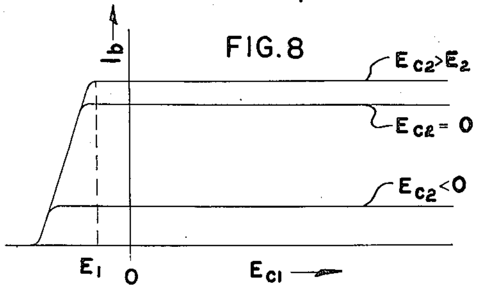
Figure 8 is a graphical representation of an operating characteristic of an electron discharge device constructed in accordance with the schematic representation of Figure 7.

An idealized representation of the anode current $I_b$-input grid voltage $E_{c1}$ characteristic of a tube constructed in accordance with Figure 7 is shown in Figure 8. It is seen that the anode current $I_b$ remains constant for all values of voltage $E_{c2}$ appearing on the second grid in excess of a critical voltage $E_2$. As the voltage on the second grid is made more negative, assuming that the first grid always operates in the constant current region, the anode current decreases. For example, when the quadrature grid voltage $E_{c2}$ is equal to zero, the operating characteristic is indicated by the curve labeled $E_{c2}=0$; and for some single arbitrary negative value of quadrature grid voltage, the anode operating characteristic is represented by the curve labeled $E_{c2}<0$. Thus, whenever, the instantaneous voltage on the first grid is greater than $E_1$ and the instantaneous voltage on the second grid is greater than or equal to $E_2$, the instantaneous anode current remains constant.

It has been seen that the tube comprises a pair of control grids 32 and 70 arranged in cascade. These grids may be compared with a pair of interrupter switches, the passage of current to the anode 52 being dependent on both switches being closed. An input signal applied to the first grid 32 results in a substantially square wave space current within the tube, the conducting and non-conducting periods being equal in length. If a signal of the same frequency is applied to the second grid 70, space current flows only during periods when the signals applied to both grids are simultaneously positive. If the signal applied to the second grid 70 is shifted 90 degrees with respect to the signal applied to the first grid 32, anode current flows during one-quarter of the cycle, while no anode current flows during the remaining three-quarters of the cycle. The average anode current therefore is one-fourth the instantaneous value of space current. Variation of the phase displacement between the two signals produces corresponding variations in the length of the conductive periods, and therefore, in the average anode current. Such a characteristic is exactly what is desired for a combined limiter-discriminator stage in a frequency modulation radio receiver.

Figure 9:
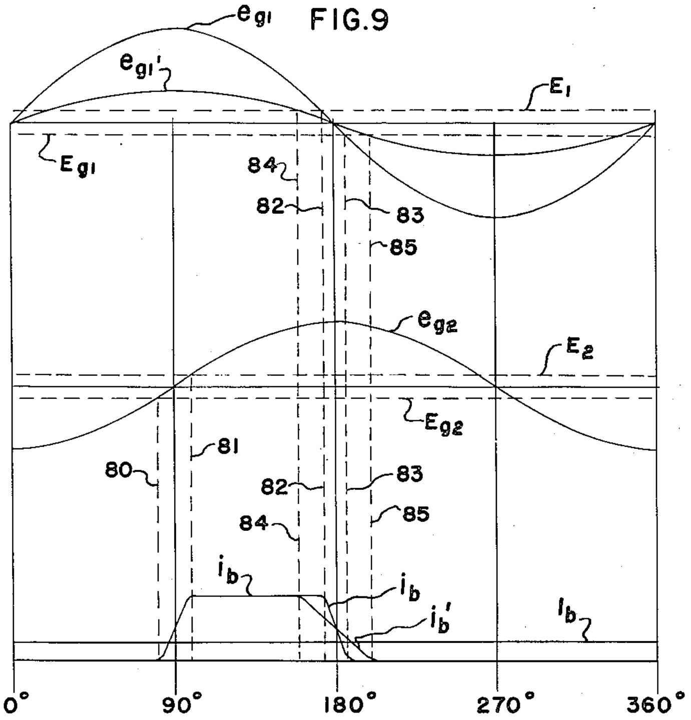
Figure 9 is a graphical representation of certain voltage and current relationships in a device such as that shown in Figure 7.

The switching action may be more fully understood by referring to Figure 9, in which certain relevant voltage and current relationships are graphically depicted. In this figure, conditions are illustrated for the case in which the voltage applied to the quadrature grid lags exactly 90 degrees behind the voltage applied to the input grid. Two conditions are illustrated, one based on a relatively large input signal voltage $e_{g1}$, and the other based on a much smaller input signal voltage $e_{g1}'$. In order to simplify the explanation, sinusoidal waveforms, and a constant signal $e_{g2}$ on the quadrature grid, are assumed.

That interval during which the signals applied to both grids are simultaneously positive, so enabling the space current to reach the anode, extends approximately from the instant denoted by the phase angle of 90° to that denoted by 180°. More accurately, anode current starts to flow at the time corresponding to the vertical line 80 when the voltage $e_{g2}$ on the quadrature grid becomes more positive than its cut-off potential $E_{g2}$; the anode current reaches its full intensity at the time corresponding to the vertical line 81 when the quadrature grid, its voltage still rising, attains the limiting level potential $E_2$. During the period of rising anode current between times 80 and 81, the potential of the first grid is greater than the potential $E_1$ required for limiting; thus, operation in the region of constant current is assured, and the anode current during this period is not affected by the potential at the input grid. If an input signal $e_{g1}$, which is large in comparison with $E_1$, is applied to the input grid, the anode current $i_b$ continues to flow with its full intensity until the time, marked by the vertical line 82, that the input grid, its voltage decreasing, becomes more negative than the limiting level potential $E_1$. At this time, the anode current $i_b$ begins to drop and reaches zero at the time, marked by line 83, that the input grid reaches cutoff $E_{g1}$. It then remains zero until, approximately three-quarters of a cycle later, the entire sequence is repeated.

If, now, the signal applied to the input grid is decreased to a smaller amplitude $e_{g1}$, the constant anode current no longer flows until the time corresponding to line 82, but the anode current $i_b'$ begins to drop at the earlier time, corresponding to line 84. On the other hand, the decrease in anode current occurs much more slowly and zero anode current is not reached until the time corresponding to line 85, considerably later than it was reached in the case of larger input signal amplitude.

The instantaneous variation of the anode current with respect to time is plotted in the lower part of Fig. 9 for both input signals amplitudes. It is seen that the steep slope of decreasing anode current $i_b$ in the case of the large input signal amplitude is intersected symmetrically by the more gradual slope $i_b'$ corresponding to the smaller signal amplitude. The point of intersection of the two slopes corresponds exactly to the phase angle of 180°.

In plotting the anode current in Fig. 9, it has been assumed that the control characteristic of the input grid is approximately straight and symmetrical. With this assumption, the area of the trapezoid bounded by the anode current curve is not changed by the transition from the steep slope to the more gradual slope. Therefore, the average anode current $I_b$ remains unchanged as the the input signal amplitude is varied, provided only that the input signal amplitude is sufficiently greater than the limiting level potential $E_1$ that the entire space current reaches the anode for at least a portion of the cycle.

Figure 10:
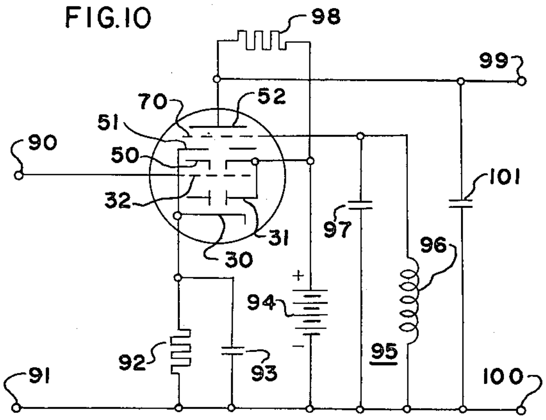
Figure 10 is a schematic circuit diagram, incorporating the device of Figure 7, of a combined limiter-discriminator stage of a frequency modulation radio receiver.

There is shown in Figure 10 a schematic circuit diagram of a combined amplitude limiter and space charge discriminator which utilizes a tube constructed in accordance with Figure 7. Input signals are applied to the first grid 32 from the output of the customary intermediate frequency amplifier (not shown) by way of input terminals 90 and 91. Suitable constant operating bias voltage is supplied by means of a cathode bias resistance 92 and associated bypass capacitance 93 arranged in circuit with the cathode 30 in the customary manner. The accelerating electrodes 31 and 50 are interconnected, either internally or externally, and connected to the positive terminal of a suitable source of positive unidirectional operating potential, here shown as a battery 94, the negative terminal of which source being connected to terminal 91. A parallel resonant circuit 95, comprising an inductance 96 and a capacitance 97, is connected between the second grid 70 and terminal 91. It is to be understood that capacitance 97 may comprise the distributed capacitance of the circuit, in which case no separate circuit element 97 appears. Audio frequency output voltage is derived from an anode load resistance 98 connected between the anode 52 and the positive terminal of source 94 by means of a pair of output terminals 99 and 100. Output terminals 99 and 100 are bypassed for the intermediate frequency by a capacitance 101.

In operation, the parallel resonant circuit 95 is tuned to resonate at the intermediate frequency. As is taught by Zakariás, a unilateral space charge coupling exists from the input grid 32 to the quadrature grid 70. That is to say, voltage is induced on the second grid 70 by the space current passed by the first grid 32; however, the potential of the first grid 32 is unaffected by the potential variation of the second grid 70. This space charge coupling between grids is equivalent phasewise to a one-way negative capacitance; consequently, the voltage induced on the second grid 70 lags the voltage of the first grid 32 by exactly 90 degrees whenever the input voltage varies at exactly the frequency to which the resonant circuit 95 is tuned. Frequency deviation of the input voltage applied to grid 32 results in a change in the phase displacement between the voltages appearing on the first and second grids 32 and 70, and thus in the average anode current. As a result the output voltage appearing across terminals 99 and 100 varies in amplitude in accordance with the frequency variation of the input signal applied between terminals 90 and 91.

The circuit described is substantially unresponsive to amplitude variations of the input signal because of the relations explained in connection with Fig. 9. The response to amplitude variations of the input signal is further reduced by the substantially constant amplitude of the quadrature signal, which develops on grid 70 as a consequence of unilateral space charge coupling from the input grid 32, for all input signal voltages exceeding a certain minimum. This stability of the quadrature voltage results from the fact that the space charge which develops in the vicinity of grid 70 is a function of the space current, and that in a tube constructed according to this invention the space current varies between zero and a constant intensity.

Figure 11:
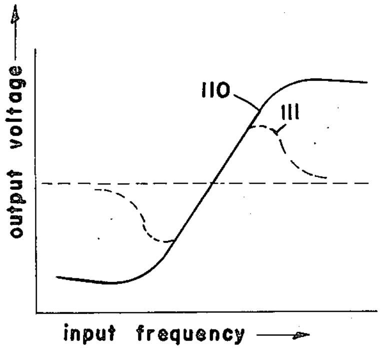
Figure 11 is the discriminator characteristic of the circuit shown schematically in Figure 10.

The demodulator characteristic for the circuit shown and described in connection with Figure 10 is shown in Figure 11 as curve 110. The demodulator characteristic for the well-known combination of an amplitude limiter and a conventional double-diode phase sensitive discriminator is shown as the dotted curve 111, the coordinate axes of curve 111 having been displaced for the purpose of facilitating comparison between the two systems. The output of the limiter-discriminator of Figure 10 is similar to that of the conventional double-diode discriminator within the linear region, although the characteristic peaks of curve 110 are less pronounced than in the case of the conventional double-diode discriminator. It is to be noted that the circuit shown in Figure 10 provided a wider linear region of operation than the conventional phase sensitive discriminator circuit, thus permitting improved tuning and greater output.

Figure 12:
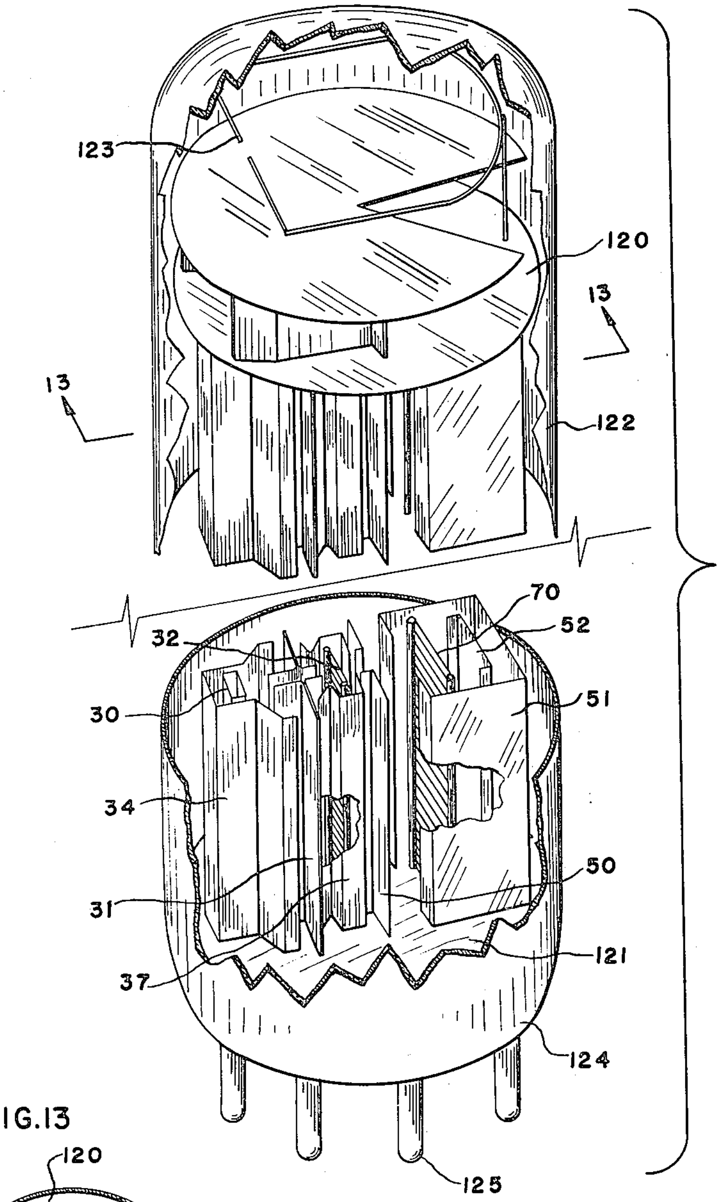
Figure 12 is an exploded perspective view, partly in section, of a physical embodiment of the invention.

There is shown in Figure 12 a perspective view, partly in section, of a combination limiter-discriminator tube constructed in accordance with the arrangement shown and described in connection with Figure 7. The electrodes are supported between a pair of mica tube mounts 120 and 121 within an evacuated envelope 122, the customary getter 123 being provided for absorbing any residual gas after evacuation. The electrodes are brought out through a sealed base 124 to respective terminals or pins 125.

Figure 13:
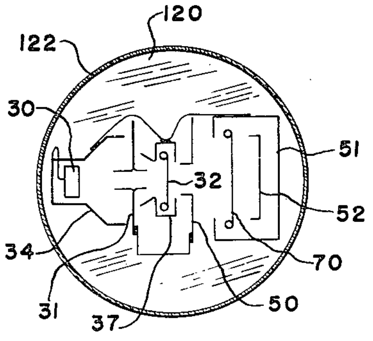
Figure 13 is a transverse section taken at 13—13 of Figure 12.

Figure 13 is a transverse section taken at 13—13 of the tube of Figure 12, and is included in order to show more completely the structure of such a tube.

Merely by way of illustration, and in no sense by way of limitation, it has been found that the following dimensions may be used in producing a tube of the type shown and described in connection with Figures 12 and 13.

| | Inches |
|---|---|
| Width of cathode 30 | .050 |
| Width of slot 35 | .030 |
| Distance from cathode 30 to slot 35 | .112 |
| Length of extending portions 36 | .047 |
| Length of extending portions 55 | .025 |
| Width of input grid 32 | .106 |
| Distance from slot 35 to grid 32 | .101 |
| Width of slot 53 | .050 |
| Width of quadrature grid 70 | .178 |
| Distance from slot 53 to grid 70 | .118 |
| Distance from slot 53 to grid 32 | .072 |

All electrodes have a longitudinal dimension of 13/16 of an inch. All of the sheet metal electrodes are constructed of four-mil stock. The input grid 32 is formed by mounting 88 substantially parallel elements per inch of 1.5-mil wire on a pair of supporting rods, and the quadrature grid 70 is constructed in a similar manner, using 72 substantially parallel elements per inch of 2-mil wire. Thus, each of the grids 32, 70 comprises a plurality of substantially coplanar parallel conducting elements disposed across the path of the electron beam to define a plurality of continuous transverse interstices across the entire width of each grid. In addition, the accelerating electrodes 31 and 50 are internally interconnected as are the cathode 30, the beam forming plate 34, the focusing electrode 37, and the shield 51, in order to minimize the number of external connections. With a tube built in accordance with these specifications, a transconductance of 4000 micromhos per milliampere space current may be obtained, and 3 milliamperes of space current are drawn with an anode operating potential of 60 volts.

While there have been shown and described certain present preferred embodiments of the invention, it is to be understood that numerous variations and modifications may be made; and it is contemplated, in the appended claims, to cover all such modifications as fall within the true spirit and scope of the invention.

I claim:

1. An electron discharge device comprising: an electron gun including a cathode for projecting a beam of space electrons; a control system comprising an accelerating electrode having an aperture registering with said beam followed by a control grid including a plurality of conducting elements disposed across the path of said beam at a distance from said accelerating electrode greater than at least one of the transverse dimensions of said aperture; a focusing system, comprising at least a focusing electrode included in said electron gun, for causing said electrons to approach said grid substantially at right angles; and an additional electrode responsive to an applied unidirectional operating potential to produce a unidirectional electrostatic accelerating field adjacent said grid on the side thereof remote from said electron gun.

2. An electron discharge device comprising: an electron gun including a cathode for projecting a beam of space electrons; a control system comprising an accelerating electrode included in said electron gun and having an aperture registering with said beam followed by a control grid including a plurality of substantially parallel conducting elements disposed across the path of said beam at a distance from said accelerating electrode greater than at least one of the transverse dimensions of said aperture; a focusing system, comprising at least a focusing electrode included in said electron gun, for causing said electrons to approach said grid substantially at right angles; and an additional electrode responsive to an applied unidirectional operating potential to produce a unidirectional electrostatic accelerating field adjacent said grid on the side thereof remote from said electron gun.

3. An electron discharge device comprising: an electron gun including a cathode for projecting a sheet-like electron beam of substantially rectangular cross-section; a control system comprising an accelerating electrode included in said electron gun and having a slot registering with said beam followed by a control grid including a plurality of substantially parallel conducting elements disposed across the path of said beam at a distance from said accelerating electrode greater than at least one of the transverse dimensions of said aperture; a focusing system, comprising at least a focusing electrode included in said electron gun, for causing the electrons constituting said beam to approach said grid substantially at right angles; and an additional electrode responsive to an applied unidirectional operating potential to produce a unidirectional electrostatic accelerating field adjacent said grid on the side thereof remote from said electron gun.

4. An electron discharge device comprising: an electron gun including a cathode for projecting a sheet-like electron beam of substantially rectangular cross-section; a control system comprising an accelerating electrode included in said electron gun and having a slot registering with said beam followed by a control grid including a plurality of substantially parallel conducting elements disposed across the path of said beam at a distance from said accelerating electrode greater than twice the smallest transverse dimension of said slot; a focusing system, comprising at least a focusing electrode included in said electron gun, for causing the electrons constituting said beam to approach said grid substantially at right angles; and an additional electrode responsive to an applied unidirectional operating potential to produce a unidirectional accelerating electrostatic field adjacent said grid on the side thereof remote from said electron gun.

5. An electron discharge device comprising: an electron gun including a cathode for projecting a beam of space electrons; a control system comprising an accelerating electrode included in said electron gun and having an aperture registering with said beam followed by a control grid including a plurality of substantially parallel coplanar conducting elements disposed across the path of said beam at a distance from said accelerating electrode greater than twice the smallest transverse dimension of said slot; a focusing system, comprising at least a focusing electrode included in said electron gun, for causing said electrons to approach said grid substantially at right angles; and an anode.

6. An electron discharge device comprising: an electron gun including a cathode for projecting a sheet-like electron beam of substantially rectangular cross-section; a control system comprising a first accelerating electrode included in said electron gun and having a slot registering with said beam followed by a control grid including a plurality of substantially parallel coplanar conducting elements disposed across the path of said beam at a distance from said accelerating electrode greater than the smallest transverse dimension of said slot; a focusing system, comprising at least a focusing electrode included in said electron gun, for causing the electrons constituting said beam to approach said grid substantially at right angles; a second accelerating electrode having a slot registering with said beam; and an anode.

7. An electron discharge device comprising: an electron gun including a cathode for projecting a sheet-like electron beam of substantially rectangular cross-section; a control system comprising an accelerating electrode included in said electron gun and having a slot bounded by substantially parallel portions extending toward said cathode and registering with said beam followed by a control grid including a plurality of substantially parallel coplanar conducting elements disposed across the path of said beam to define a plurality of continuous transverse interstices across the entire width of said grid at a distance from said accelerating electrode greater than the smallest transverse dimension of said slot; a focusing system, comprising at least a focusing electrode included in said electron gun, for causing the electron constituting said beam to approach said grid substantially at right angles; and an anode.

8. An electron discharge device comprising: an electron gun including a cathode for projecting a sheet-like electron beam of substantially rectangular cross-section; a control system comprising an accelerating electrode included in said electron gun and having a slot registering with said beam followed by a control grid including a plurality of substantially parallel conducting elements disposed across the path of said beam to define a plurality of continuous transverse interstices across the entire width of said grid at a distance from said accelerating electrode greater than twice the smallest transverse dimension of said slot; a focusing system, comprising at least a focusing electrode included in said electron gun, for causing the electrons constituting said beam to approach said grid substantially at right angles; a second slotted accelerating electrode; and an anode.

9. In an electron discharge device of the type in which the electron space current is confined to a beam: a control system comprising an apertured accelerating electrode followed by an intensity control grid which consists essentially of a plurality of substantially parallel conducting elements disposed across the path of said beam at a distance from said accelerating electrode greater than at least one of the transverse dimensions of the aperture of said accelerating electrode; and a focusing system for causing the space electrons constituting said beam to approach said grid substantially at right angles.

10. In an electron discharge device of the type in which the electron space current flows in a sheet-like beam of substantially rectangular cross-section: a control system comprising a slotted accelerating electrode followed by an intensity control grid which consists essentially of a plurality of substantially parallel conducting elements disposed across the path of said beam at a distance from said accelerating electrode greater than the smallest transverse dimension of the slot of said accelerating electrode; and a focusing system for causing the space electrons constituting said beam to approach said grid substantially at right angles.

11. In an electron discharge device of the type in which the electron space current is confined to a beam; a pair of control systems arranged in cascade along the path of said beam, each of said systems comprising an apertured accelerating electrode followed by a control grid which comprises a plurality of substantially parallel conducting elements disposed across said path at a distance from the accelerating electrode greater than at least one of the transverse dimensions of the aperture of the accelerating electrode.

12. In an electron discharge device of the type in which the electron space current flows in a sheet-like beam of substantially rectangular cross-section: a pair of control systems arranged in cascade along the path of said beam, each of said systems comprising a slotted accelerating electrode followed by a control grid which comprises a plurality of substantially parallel conducting elements disposed across said path at a distance from the accelerating electrode greater than the smallest transverse dimension of the slot of the accelerating electrode.

13. An electron discharge device comprising in the order named: an electron gun for projecting an electron beam; a first accelerating electrode included in said electron gun and having an aperture registering with said beam; a first control grid spaced from said first accelerating electrode by a distance greater than at least one of the transverse dimensions of said aperture and including a plurality of substantially parallel coplanar conducting elements disposed across the path of said beam; a second accelerating electrode having an aperture registering with said beam; a second control grid spaced from said second accelerating electrode by a distance greater than at least one of the transverse dimensions of the aperture of said second accelerating electrode and including a plurality of substantially parallel conducting elements disposed across said path; and an anode.

14. An electron discharge device comprising in the order named: an electron gun for projecting a sheet-like electron beam of substantially rectangular cross-section; a first accelerating electrode included in said electron gun and having a slot registering with said beam; a first control grid spaced from said first accelerating electrode by a distance greater than the smallest transverse dimension of said slot and including a plurality of substantially parallel coplanar conducting elements disposed across the path of said beam; a second accelerating electrode having a slot registering with said beam; a second control grid spaced from said second accelerating electrode by a distance greater than the smallest transverse dimension of the slot of said second accelerating electrode and including a plurality of substantially parallel conducting elements disposed across said path; and an anode.

15. An electron discharge device comprising in the order named: an electron gun including a cathode for projecting a sheet-like electron beam of substantially rectangular cross-section; a first accelerating electrode included in said electron gun and having a slot bounded by a pair of parallel portions extending toward said cathode and registering with said beam; a first control grid spaced from said first accelerating electrode by a distance greater than the smallest transverse dimension of said slot and including a plurality of substantially parallel coplanar conducting elements disposed across the path of said beam to define a plurality of continuous transverse interstices across the entire width of said first grid; a focusing electrode disposed about said first grid and having a transverse opening in register with said beam adjacent each side of said first grid; a second accelerating electrode having a slot registering with said beam; a second control grid spaced from said second accelerating electrode by a distance greater than the smallest transverse dimension of the slot of said second accelerating electrode and including a plurality of substantially parallel conducting elements disposed across said path; and an anode.

ROBERT ADLER.

REFERENCES CITED

The following references are of record in the file of this patent:

UNITED STATES PATENTS

| Number | Name | Date |
|---|---|---|
| 2,126,286 | Schlesinger | Aug. 9, 1938 |
| 2,153,269 | Nicoll | Apr. 4, 1939 |
| 2,190,515 | Hahn | Feb. 13, 1940 |
| 2,190,735 | Rust et al. | Feb. 20, 1940 |
| 2,210,127 | Rogowski | Aug. 6, 1940 |
| 2,343,263 | Okrent | Mar. 7, 1944 |
| 2,397,233 | Bingley | Mar. 26, 1946 |
| 2,409,485 | Herold | Oct. 15, 1946 |
| 2,409,644 | Samuel | Oct. 22, 1946 |
| 2,434,713 | Mueller | Jan. 20, 1948 |
| 2,460,120 | Bondley | Jan. 25, 1949 |

Certificate of Correction

Patent No. 2,511,143 June 13, 1950

ROBERT ADLER

It is hereby certified that errors appear in the printed specification of the above numbered patent requiring correction as follows:

Column 1, line 17, for the word "As" read *An*; column 5, line 19, for "position" read *perveance*; line 48, for "portion" read *portions*;

and that the said Letters Patent should be read with these corrections therein that the same may conform to the record of the case in the Patent Office.

Signed and sealed this 12th day of September, A. D. 1950.

[SEAL]

THOMAS F. MURPHY,
*Assistant Commissioner of Patents.*